(No Model.)

A. W. BREWTNALL.
CABLE COUPLING.

No. 265,746. Patented Oct. 10, 1882.

WITNESSES:
Thos Houghton.
Solon C. Kemon

INVENTOR:
A. W. Brewtnall
BY
ATTORNEYS.

UNITED STATES PATENT OFFICE.

ARTHUR W. BREWTNALL, OF LONDON, COUNTY OF MIDDLESEX, ENGLAND.

CABLE-COUPLING.

SPECIFICATION forming part of Letters Patent No. 265,746, dated October 10, 1882.

Application filed March 24, 1882. (No model.) Patented in England November 29, 1881, No. 5,226; in France December 30, 1881, No. 146,614; in Germany January 7, 1882, and in Belgium February 25, 1882, No. 57,167.

*To all whom it may concern:*

Be it known that I, ARTHUR WILFRED BREWTNALL, of Great Coram Street, London, in the county of Middlesex, England, have invented a new and Improved Cable-Coupling; and I do hereby declare that the following is a full, clear, and exact description of the same, reference being had to the accompanying drawings, forming part of this specification.

My invention relates to improved means of coupling branch wires to main conducting wires or cables, (as required in the installation of electric lamps, for example,) whereby the connections of the wires may be made and the insulation of the couplings effected with great ease and rapidity.

Figure 1:
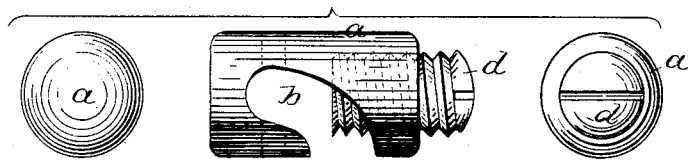
Figure 2:
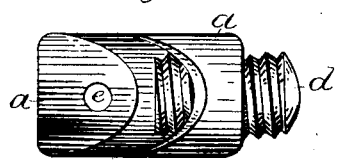
Figure 3:
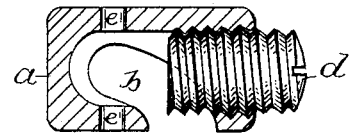
Figure 4:
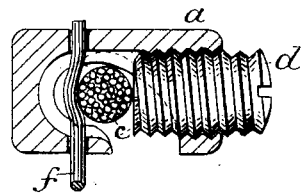
Figure 5:
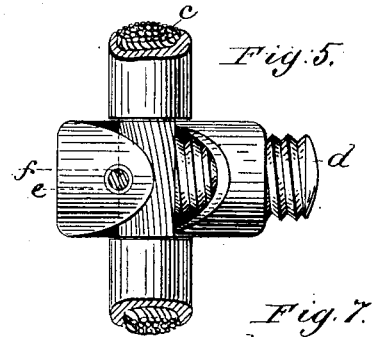
Figure 6:
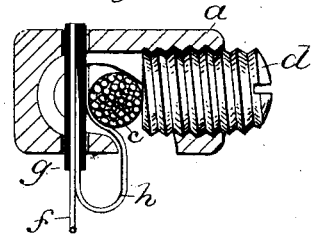
Figure 7:
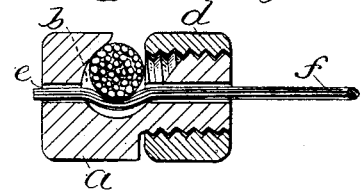
Figure 8:
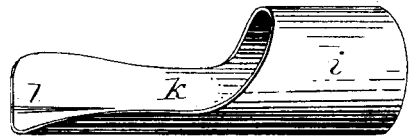
Figure 9:
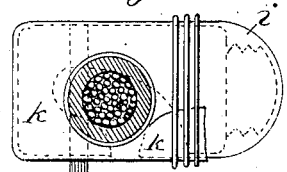

Figure 1 represents side and end views of the coupling; Fig. 2, a view of the coupling at right angles to Fig. 1, and Fig. 3 is a longitudinal section of the coupling. Fig. 4 represents a similar section, and Fig. 5 a view similar to Fig. 2 of the coupling as applied to couple up a branch to a main wire or cable. Fig. 6 represents a fusible connection between the wires for preventing overheating of the wires in case of short circuit. Fig. 7 represents in longitudinal section a modification of the coupling. Fig. 8 represents an insulating-sheath for the coupling. Fig. 9 represents a coupling with the sheath applied.

The coupling consists of two parts—a hook-shaped jaw to receive the main wire or cable and a binding-screw screwing up toward the jaw, which is also formed with a hole intersecting the hollow of the jaw to receive the branch wire, the arrangement being such that the pressure of the screw will at same time cause the main wire or cable to be tightly gripped in the jaw and held in forcible contact with the branch wire, which is also gripped tightly, the two wires lying across one another.

*a* is a cylindrical stud, made of brass or other suitable metal, having a transverse groove cut in it at one side to form a hook-shaped jaw, *b*, to receive the main wire or cable *c*, bared at this point of its insulating-envelope, and provided with a binding-screw, *d*, screwing into or upon the stud, and with a hole, *e*, intersected by or crossing the groove of the jaw *b*, so that the wires placed in the jaw and hole respectively shall be in contact at the point where they cross one another. In Figs. 1, 2, 3, 4, 5, 6, and 9 this hole *e* passes transversely through the stud *a*, and the screw *d* is a male screw screwing into a corresponding female screw tapped in the stud *a*, and screws up against the main wire or cable lying in the jaw, the act of tightening up the screw forcing the cable into the jaw and into contact with the branch wire *f*, binding the latter tightly in the coupling, thus affording a secure and ready means of attachment and a good electrical connection. The hole *e* might, however, be longitudinal and pass axially through the stud *a*, as in Fig. 7, in which case the screw *d* would be a nut screwing on a male screw upon the stud, as shown.

The fusible connection shown in Fig. 6 is made as follows: The branch wire *f*, at the part where it is inserted in the hole *e*, is enveloped in a sheath of vulcanite or other insulating material, *g*, so as to insulate it from the coupling *a*, and a strip of lead wire, *h*, or other easily-fusible metal or alloy is inserted in the sheath *g* alongside the wire *f*, and is bent round and clamped against the cable *c* by the pressure of screw *d*. In case of short circuit occurring the wire *h* will melt and drop off, and thus break the connection and prevent overheating of the wires.

The insulating-sheath shown in Figs. 8 and 9 is made of india-rubber, gutta-percha, or other insulating material, and is in the form of a short tube, *i*, closed at one end and provided with an extension or tab, *k*, at the other, and is so applied to the coupling as to completely envelope it, as shown, the tab *k* being lapped round and secured by cementing, tying, or otherwise, so that the whole of the coupling and the bared portion of the main wire or cable are enveloped and insulated. The tab *k* is slit at *l* to enable it to pass the wire *f*, as shown in Fig. 9.

I am aware that a connection for tightening rods constructed with passages for the rods transverse to each other, so that the rods will be in close contact with each other at their intersection, and provided with a screw-threaded socket opposite the intersection of the passages to receive the screw-threaded end of a receiving-rod, which bears upon one rod and forces it upon the other, has heretofore been employed, and I therefore lay no claim to such invention.

Having thus described my invention, what I claim as new is—

1. In a coupling for connecting a branch to a main wire or cable for electrical purposes, the combination of a hooked-shaped jaw for the main wire or cable, intersected by a hole for the branch wire, as described, with a binding-screw adapted to press the main wire into the hollow of the jaw and into forcible contact with the branch wire, substantially as herein shown and described.

2. A coupling for connecting a branch to a main wire or cable, constructed of a stud, $a$, having a hooked-shaped jaw, $b$, a hole, $e$, and a binding-screw, $d$, combined for use, substantially as herein specified and shown.

3. The combination, with the coupling herein described, and with the branch wire and cable held therein, as described, of the insulating-sheath $g$ and the fusible-wire connection $h$, applied substantially as and for the purpose set forth.

4. The combination, with a coupling constructed of a stud with hooked jaw and hole, and a binding-screw for connecting a branch to a main wire or cable, of an insulating-sheath formed of a tube closed at one end and provided with an extension or tab at the other and applied to the coupling, substantially as herein described and shown.

The above specification of my invention signed by me the 15th day of February, 1882.

ARTHUR W. BREWTNALL.

Witnesses:
WM. CLARK,
53 *Chancery Lane, London, Patent Agent.*
F. W. KENNARD,
53 *Chancery Lane, Clerk.*